(12) United States Patent
Liao et al.

(10) Patent No.: US 9,792,722 B2
(45) Date of Patent: Oct. 17, 2017

(54) DEPTH PROCESSING METHOD AND ASSOCIATED GRAPHIC PROCESSING CIRCUIT

(71) Applicant: MediaTek Inc., Hsinchu (TW)

(72) Inventors: Ming-Hao Liao, Hsinchu (TW); Chih-Ching Chen, Hsinchu (TW); Hung-Wei Wu, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 119 days.

(21) Appl. No.: 14/576,036

(22) Filed: Dec. 18, 2014

(65) Prior Publication Data

US 2016/0180579 A1 Jun. 23, 2016

(51) Int. Cl.
*G06T 15/40* (2011.01)
*G06T 15/00* (2011.01)

(52) U.S. Cl.
CPC .......... *G06T 15/405* (2013.01); *G06T 15/005* (2013.01)

(58) Field of Classification Search
CPC ..... G06T 15/005; G06T 15/40; G06T 15/405; G06T 15/00
See application file for complete search history.

(56) References Cited

U.S. PATENT DOCUMENTS

| 6,924,801 | B1 | 8/2005 | Dorbie |
| 7,170,513 | B1 | 1/2007 | Voorhies et al. |
| 2006/0209078 | A1* | 9/2006 | Anderson ............ G06T 15/005 345/506 |
| 2008/0136816 | A1 | 6/2008 | Morphet |
| 2008/0273031 | A1 | 11/2008 | Shao |
| 2009/0058848 | A1 | 3/2009 | Howson |
| 2012/0206455 | A1* | 8/2012 | Shreiner ............... G06T 15/005 345/420 |
| 2013/0194264 | A1 | 8/2013 | Howson |
| 2013/0241938 | A1* | 9/2013 | Gruber ................... G06T 11/40 345/501 |
| 2015/0187125 | A1* | 7/2015 | Hasselgren ........... G06T 15/405 345/422 |

* cited by examiner

*Primary Examiner* — Haixia Du
(74) *Attorney, Agent, or Firm* — Han IP Corporation; Andy M. Han

(57) ABSTRACT

A depth processing method and associated graphic processing circuit is provided. The method comprises loading geometry data of a scene and performing a vertex transformation thereof. After the geometry data is segmented in a tile resolution, pre-depth data of the scene are obtained. After the geometry data are segmented in a bin resolution, plural bin tables are generated. Then, the plural bin tables are converted into plural tiles, the plural converted tiles are classified into a first portion of tiles and a second portion of tiles according to depth data of the converted tiles and the pre-depth data of the scene, and the second portion of tiles are discarded. After the first portion of tiles are processed, a color value and a depth value of each pixel of the scene are generated.

35 Claims, 5 Drawing Sheets

DEPTH PROCESSING METHOD AND ASSOCIATED GRAPHIC PROCESSING CIRCUIT

TECHNICAL FIELD

The present disclosure relates to a graphic processing method and a graphic processing circuit, and more particularly to a depth processing method and associated graphic processing circuit.

BACKGROUND

Unless otherwise indicated herein, approaches described in this section are not prior art to the claims listed below and are not admitted to be prior art by inclusion in this section.

Recently, with the rapid development of the computer technology and the game software, the 3D games developed according to the 3D displaying technology can provide vivid and gorgeous images. Since the handheld devices are gradually adopted, the 3D displaying technology is gradually applied to the handheld devices. For example, the handheld devices are smart phones, tablet computers or other mobile devices.

Generally, a 3D graphic processing circuit is a core of processing the 3D images. For displaying the exquisite 3D images, the 3D graphic processing circuit consumes a great deal of electric power. Especially when the 3D graphic processing circuit is disposed in a mobile device, the electric power of the mobile device is quickly consumed.

Therefore, it is important to increase the performance of the 3D graphic processing circuit while reducing the consumption of the electric power and extending the operating time of the mobile device.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

The present disclosure provides a 3D graphic processing circuit and a depth processing method. By utilizing a dual pre-Z testing and occlusion culling mechanism with binning rendering, the processing efficiency of a pixel shader circuit of the 3D graphic processing circuit is enhanced.

The present disclosure provides a graphic processing circuit. The 3D graphic processing circuit includes a vertex processing circuit and a pixel processing circuit. The vertex processing circuit includes a geometry processing circuit, a pre-Z testing circuit and a bin store. The geometry processing circuit is used for loading geometry data of a scene and performing a vertex transformation. The pre-Z testing circuit is used for receiving the geometry data after the vertex transformation and segmenting the geometry data in a tile resolution, thereby obtaining pre-depth data of the scene. The bin store is used for receiving the geometry data after the vertex transformation and segmenting the geometry data in a bin resolution, thereby generating plural bin tables. The pixel processing circuit includes a rasterization processing circuit and a rendering device. The rasterization processing circuit is used for loading the plural bin tables, converting the plural bin tables into plural tiles, classifying the plural converted tiles into a first portion of tiles and a second portion of tiles according to depth data of the converted tiles and the pre-depth data of the scene, and discarding the second portion of tiles. The rendering device is used for receiving and processing the first portion of tiles, thereby generating a color value and a depth value of each pixel of the scene.

The present disclosure further provides a graphic processing circuit including a vertex processing circuit and a pixel processing circuit. The vertex processing circuit includes a geometry processing circuit, a pre-Z testing circuit and a bin store. The geometry processing circuit is used for loading geometry data of a scene and performing a vertex transformation. The pre-Z testing circuit is used for receiving the geometry data after the vertex transformation and segmenting the geometry data in a tile resolution, thereby obtaining pre-depth data of the scene. The bin store is used for receiving the geometry data after the vertex transformation and segmenting the geometry data in a bin resolution, thereby generating plural bin tables. The bin store further generates an intermediate information according to the geometry data, and the intermediate information is stored in the bin tables. The pixel processing circuit includes a rasterization processing circuit and a rendering device. The rasterization processing circuit is used for loading the plural bin tables, early discarding plural obscured primitives according to the intermediate information and the pre-depth data of the scene, converting the unobscured primitives into plural tiles, classifying the plural converted tiles into a first portion of tiles and a second portion of tiles according to depth data of the converted tiles and the pre-depth data of the scene, and discarding the second portion of tiles. The rendering device is used for receiving and processing the first portion of tiles, thereby generating a color value and a depth value of each pixel of the scene.

The present disclosure also provides a depth processing method for a graphic processing circuit. The depth processing method includes the following operations. Firstly, the geometry data of a scene is loaded and a vertex transformation is performed. Then, the geometry data after the vertex transformation is segmented in a tile resolution, so that pre-depth data of the scene are obtained. Then, the geometry data after the vertex transformation are segmented in a bin resolution, so that plural bin tables are generated. Then, the plural bin tables are converted into plural tiles, the plural converted tiles are classified into a first portion of tiles and a second portion of tiles according to depth data of the converted tiles and the pre-depth data of the scene, and the second portion of tiles are discarded. Afterwards, the first portion of tiles are processed, so that a color value and a depth value of each pixel of the scene are generated.

Numerous objects, features and advantages of the present disclosure will be readily apparent upon a reading of the following detailed description of embodiments of the present disclosure when taken in conjunction with the accompanying drawings. However, the drawings employed herein are for the purpose of descriptions and should not be regarded as limiting.

BRIEF DESCRIPTION OF THE DRAWINGS

The above objects and advantages of the present disclosure will become more readily apparent to those ordinarily skilled in the art after reviewing the following detailed description and accompanying drawings, in which.

DETAILED DESCRIPTION OF PREFERRED EMBODIMENTS

Figure 1:
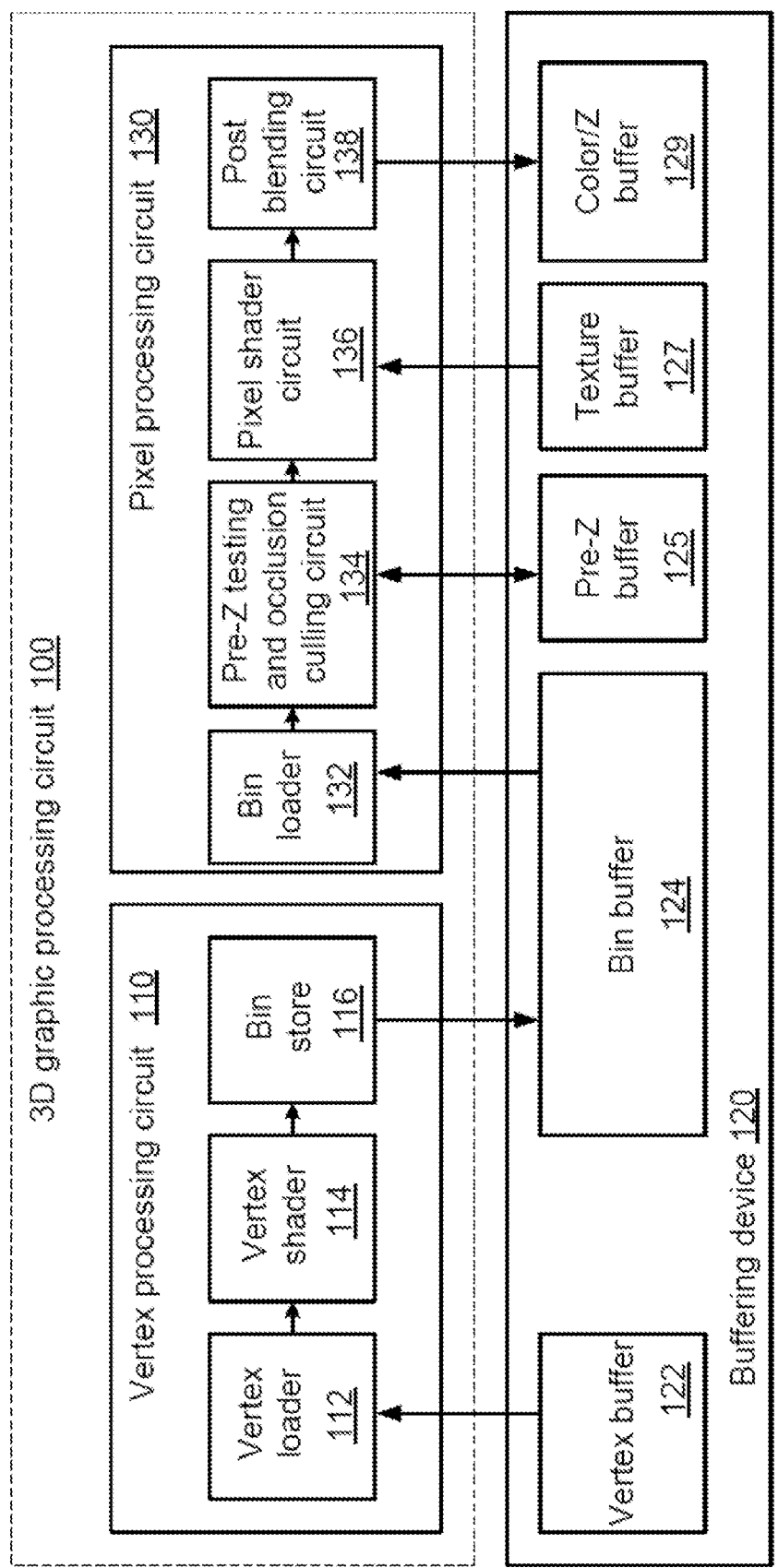
FIG. 1 is a schematic circuit block diagram illustrating a 3D graphic processing circuit.

FIG. 1 is a schematic circuit block diagram illustrating a 3D graphic processing circuit. As shown in FIG. 1, the 3D graphic processing circuit 100 comprises a vertex processing circuit (VP) 110 and a pixel processing circuit (PP) 130. The 3D graphic processing circuit 100 is connected to a buffering device 120. For example, the buffering device 120 is an external memory, e.g. DRAM or SRAM.

The vertex processing circuit 110 comprises a vertex loader 112, a vertex shader 114 and a bin store 116. The buffering device 120 comprises a vertex buffer 122 and a bin buffer 124.

According to a 3D displaying technology, a scene contains plural objects. Each object is composed of plural primitives. An example of the primitive includes but is not limited to a triangle, a line or a point.

While a scene is processed by the 3D graphic processing circuit 100, the vertex data of all primitives may be temporarily stored into the vertex buffer 122 by an application programming interface (API), and thus these vertex data may be further processed by the vertex processing circuit 110. For example, the vertex data of each primitive contains the position information, the color information and the texture coordinate of all vertexes that constitute the primitive.

The vertex processing circuit 110 converts a frame in the scene from a 3D world space coordinate system to a 2D screen space coordinate system. Firstly, the vertex data of the primitives stored in the vertex buffer 122 are loaded into the vertex loader 112 and transmitted to the vertex shader 114. Consequently, a vertex transformation is performed by the vertex shader 114.

The vertex shader 114 may perform a lighting operation and a vertex transformation on the primitives according to programmable shader codes. After the vertex transformation is completed, all primitives are converted to the 2D screen space coordinate system and then transmitted to the bin store 116.

Generally, one scene is divided into plural bins. For example, the size of one bin is 32 pixels×32 pixels. In case that the scene is composed of 1024 pixels×1024 pixels, the scene may be divided into 1024 bins. It should be noted that the size of the bin and the size of the scene are not restricted.

In particular, after the vertex transformation is completed, the relationship between all primitives and the bins are established in the bin store 116 and then stored into the bin buffer 124. For example, if the screen space coordinate of the first primitive after the vertex transformation touches two bins, the vertex data of the first primitive may be recorded into the bin tables of the bin store 116 corresponding to the two bins.

Similarly, after all primitives are subjected to the vertex transformation, the vertex data of all primitives touching each bin may be recorded by the bin store 116. For example, if the screen space coordinates of five primitives after the vertex transformation touch the first bin, the vertex data of the five primitives may be recorded into the bin table corresponding to the first bin. In other words, the bin tables corresponding to all bins may be further stored into the bin buffer 124 by the bin store 116. Moreover, each bin table corresponding to a specified bin contains the vertex data of the primitives touching the specified bin.

The pixel processing circuit 130 comprises a bin loader 132, a pre-Z testing and occlusion culling circuit 134, a pixel shader circuit 136 and a post blending circuit 138. The buffering device 120 further comprises a pre-Z buffer 125, a texture buffer 127 and a color/Z buffer 129.

The bin tables temporarily stored in the bin buffer 124 may be loaded into the bin loader 132 of the pixel processing circuit 130 and then transmitted to the pre-Z testing and occlusion culling circuit 134.

After the bin tables are received by the pre-Z testing and occlusion culling circuit 134, the pre-Z testing and occlusion culling circuit 134 may sort the depth data of all primitives in the bin tables. Consequently, the smallest depth data is determined.

During the sorting process, the pre-Z testing and occlusion culling circuit 134 may selectively transmit a specified primitive to the pixel shader circuit 136 according to the result of comparing the depth data of the primitives to be processed with the pre-depth data stored in the pre-Z buffer 125, update the depth data corresponding to the specified primitive, and temporarily store the updated depth data into the pre-Z buffer 125. For example, after the sorting process is completed, the pre-depth data stored in the pre-Z buffer 125 is the smallest depth data. The primitive corresponding to the smallest depth data is the closest to the observer.

For example, if the first primitive, the second primitive and the third primitive of the first bin table are loaded into the bin loader 132 and transmitted to the pre-Z testing and occlusion culling circuit 134, the depth data of the first primitive, the second primitive and the third primitive are $z1$, $z2$ and $z3$, respectively, wherein $z1$ is smaller than $z2$ and $z1$ is larger than $z3$ (i.e. $z3<z1<z2$).

Firstly, the pre-Z testing and occlusion culling circuit 134 temporarily stores the depth data $z1$ of the first primitive into the pre-Z buffer 125 as the pre-depth data, and transmits the first primitive to the pixel shader circuit 136.

Then, the pre-Z testing and occlusion culling circuit 134 judges the second primitive. Since the pre-depth data stored in the pre-Z buffer 125 is $z1$ and $z1$ is smaller than $z2$, the second primitive is deeper than the first primitive among the whole scene. Under this circumstance, the second primitive is obscured by the first primitive, and thus the second primitive needs not be shown on the display screen. Preferably, the second primitive is culled. Thus, the second primitive needs not to be transmitted to and processed by the pixel shader circuit 136. Meanwhile, the pre-depth data $z1$ is still temporarily stored in the pre-Z buffer 125.

Then, the pre-Z testing and occlusion culling circuit 134 judges the third primitive. Since the pre-depth data stored in the pre-Z buffer 125 is $z1$ and $z1$ is larger than $z3$, the first primitive is deeper than the third primitive among the whole scene. Under this circumstance, the first primitive is obscured by the third primitive. Consequently, the third primitive cannot be culled. Then, the third primitive is transmitted to the pixel shader circuit 136 to be processed, and the depth data z3 is temporarily stored in the pre-Z buffer 125 as the pre-depth data. That is, the pre-depth data z1 is replaced by the pre-depth data z3.

In this embodiment, the pre-Z testing and occlusion culling circuit 134 may compare depth data of the specified primitive with the pre-depth data which is temporarily stored in the pre-Z buffer 125. If the depth data of the specified primitive is larger, the specified primitive is culled. On the other hand, if the depth data of the specified primitive is smaller, the pre-depth data temporarily stored in the pre-Z buffer 125 is replaced by the depth data of the specified primitive and the specified primitive is transmitted to the pixel shader circuit 136 for further processing.

After the depth data of all primitives in the bin table are sorted, the pre-depth data of the pre-Z buffer 125 corresponding to the first bin is the depth data of the primitive which is the closest to the display screen.

After the primitive is received by the pixel shader circuit 136 of the pixel processing circuit 130, the pixel shader circuit 136 performs an arithmetic operation on all pixels of the primitive, selectively reads a specified texture from the texture buffer 127 and transmits the specified texture to the post blending circuit 138. Consequently, the post blending circuit 138 generates the color values and the depth values of all pixels of the scene and stores the color and depth values into the color/Z buffer 129.

As mentioned above, the pre-Z testing and occlusion culling circuit 134 of the 3D graphic processing circuit 100 may compare the depth data of the specified primitive with the pre-depth data and selectively transmits the specified primitive to the pixel shader circuit 136 according to the comparing result. However, since the bin loader 132 of the pixel processing circuit 130 is unable to determine the sequence of inputting the primitives to the pre-Z testing and occlusion culling circuit 134, the processing efficiency of the pixel shader circuit 136 may be impaired.

Figure 2A:
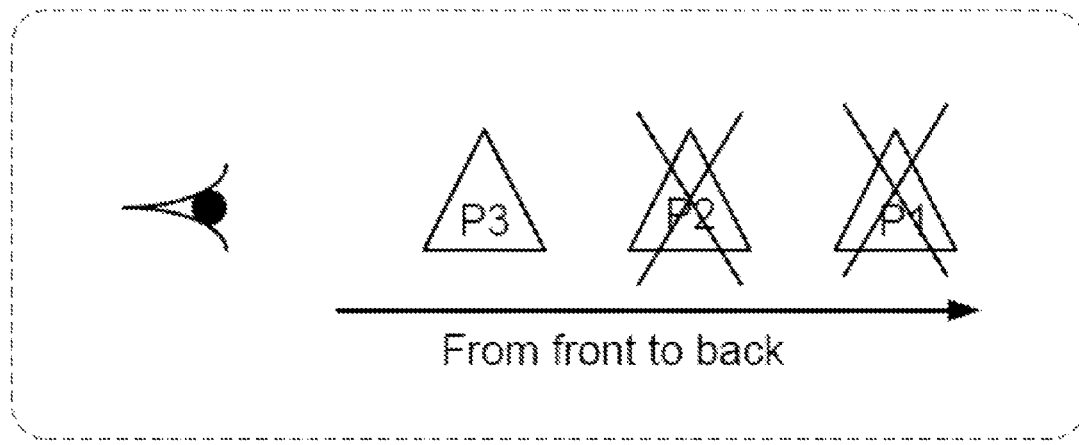
FIGS. 2A and 2B illustrate two sequences of inputting three primitives into the pre-Z testing and occlusion culling circuit of the 3D graphic processing circuit of FIG. 1.
Figure 2B:
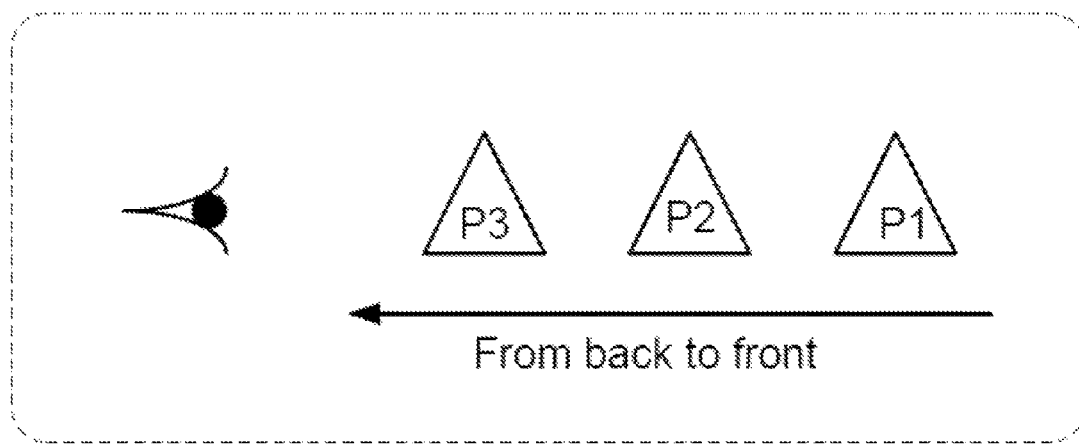

FIGS. 2A and 2B illustrate two sequences of inputting three primitives into the pre-Z testing and occlusion culling circuit 134 of the 3D graphic processing circuit 100 of FIG. 1.

As shown in FIG. 2A, the primitive P3 which is the closest to the eye of the observer has the smallest depth data, and the primitive P1 which is the farthest from the eye of the observer has the largest depth data. In case that the three primitives P3, P2 and P1 are sequentially inputted into the pre-Z testing and occlusion culling circuit 134 in the from-front-to-back order, only the primitive P3 is transmitted to the pixel shader circuit 136 while the primitives P2 and P1 are culled. Under this circumstance, the pixel shader circuit 136 has better processing efficiency.

Please refer to FIG. 2B. In case that the three primitives P1, P2 and P3 are sequentially inputted into the pre-Z testing and occlusion culling circuit 134 in the from-back-to-front order, all of the three primitives P1, P2 and P3 are transmitted to the pixel shader circuit 136 and the depth data stored in the pre-Z buffer 125 is sequentially replaced. Since the primitive P3 has the smallest depth data, the primitives P2 and P1 are obscured by the primitive P3. In fact, the procedures of transmitting the primitives P2 and P1 to the pixel shader circuit 136 are needless. In other words, the sequence of inputting the primitives as shown in FIG. 2B may adversely affect the processing efficiency of the pixel shader circuit 136.

Figure 3:
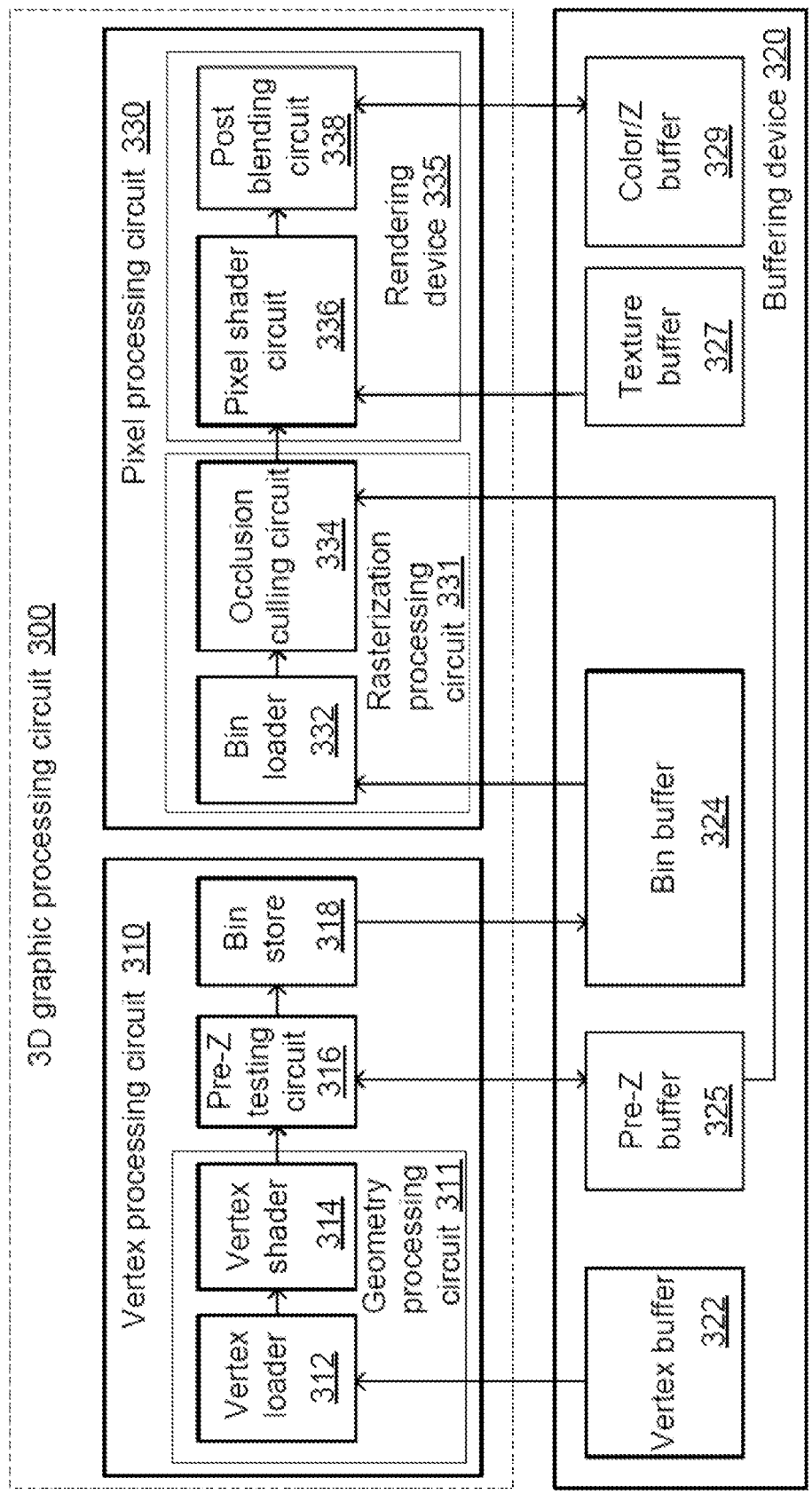
FIG. 3 is a circuit block diagram illustrating a 3D graphic processing circuit according to an embodiment of the present disclosure.

FIG. 3 is a circuit block diagram illustrating a 3D graphic processing circuit 300 according to a first embodiment of the present disclosure. As shown in FIG. 3, the 3D graphic processing circuit 300 comprises a vertex processing circuit (VP) 310 and a pixel processing circuit (PP) 330. The 3D graphic processing circuit 300 is connected to a buffering device 320. For example, the buffering device 320 is an external memory, e.g. DRAM or SRAM.

The vertex processing circuit 310 comprises a geometry processing circuit 311, a pre-Z testing circuit 316 and a bin store 318. The geometry processing circuit 311 comprises a vertex loader 312 and a vertex shader 314. The buffering device 320 comprises a vertex buffer 322, a pre-Z buffer 325 and a bin buffer 324. The operating principles of the vertex processing circuit 310 will be illustrated as follows. The primitives described in this embodiment are opaque.

While a scene is processed by the 3D graphic processing circuit 300, the geometry data of all primitives may be temporarily stored into the vertex buffer 322 by an application programming interface (API), and thus these geometry data may be further processed by the vertex processing circuit 310. An example of the primitive includes but is not limited to a quadrangle, a triangle, a line or a point. For example, the geometry data may be a vertex data. The geometry data of each primitive contains the position information, the color information and the texture coordinate of all vertexes that constitute the primitive.

The vertex processing circuit 310 converts a frame in the scene from a 3D world space coordinate system to a 2D screen space coordinate system. The geometry processing circuit 311 loads the geometry data into the vertex processing circuit 310.

Firstly, the geometry data of the primitives stored in the vertex buffer 322 are loaded into the vertex loader 312 and transmitted to the vertex shader 314. Consequently, a vertex transformation is performed by the vertex shader 314.

The vertex shader 314 may perform a lighting operation and a vertex transformation on the primitives according to programmable shader codes. After the vertex transformation is completed, all primitives are converted to the 2D screen space coordinate system and then transmitted to the pre-Z testing circuit 316.

In this embodiment, one scene is divided into plural tiles or plural bins. The size of the tile is smaller than the size of the bin. For example, the size of one tile is 4 pixels×4 pixels, and the size of one bin is 32 pixels×32 pixels. In case that the scene is composed of 1024 pixels×1024 pixels, the scene may be divided into 65536 tiles or 1024 bins. It should be noted that the sizes of the tile, the bin and the scene are not restricted.

Moreover, after the vertex transformation is completed, the pre-Z testing circuit 316 will construct the pre-depth data of the whole scene in a tile resolution according to all primitives and store the pre-depth data into the pre-Z buffer 325.

For example, after the vertex transformation is completed, the relationship between all primitives and the tiles are established by the pre-Z testing circuit 316 and stored into the pre-Z buffer 325. Preferably, the 3D graphic processing circuit 300 may segment the primitives into plural tiles, determine pre-depth data of all tiles and temporarily store the same into the pre-Z buffer 325.

For example, assume that the first primitive, the second primitive and the third primitive touch the first tile after the vertex transformation is performed by the vertex shader 314. The depth data of the first primitive, the second primitive and the third primitive corresponding to the first tile are za, zb and zc, respectively, wherein za is larger than zb and zb is larger than zc, i.e. $zc<zb<za$.

Firstly, the depth data za of the first primitive corresponding to the first tile is temporarily stored into the pre-Z buffer 325 by the pre-Z testing circuit 316.

Then, the pre-Z testing circuit 316 judges the depth data zb of the second primitive corresponding to the first tile. Since the pre-depth data stored in the pre-Z buffer 325 is za and za is larger than zb, the first primitive corresponding to the first tile is deeper than the second primitive corresponding to the first tile among the whole scene. Under this circumstance, the first primitive corresponding to the first tile is obscured by the second primitive, and thus the first primitive corresponding to the first tile cannot be shown on the display screen. Meanwhile, the pre-Z testing circuit 316 temporarily stores the depth data zb into the pre-Z buffer 325. Consequently, the depth data zb is the updated pre-depth data in replace of the original pre-depth data za.

Then, the pre-Z testing circuit 316 judges the depth data zc of the third primitive corresponding to the first tile. Since the pre-depth data stored in the pre-Z buffer 325 is zb and zb is larger than zc, the second primitive corresponding to the first tile is deeper than the third primitive corresponding to the first tile among the whole scene. Under this circumstance, the second primitive corresponding to the first tile is obscured by the third primitive, and thus the second primitive corresponding to the first tile cannot be shown on the display screen. Meanwhile, the pre-Z testing circuit 316 temporarily stores the depth data zc into the pre-Z buffer 325. Consequently, the depth data zc is the updated pre-depth data in replace of the original pre-depth data zb.

In this embodiment, the pre-Z testing circuit 316 may compare the depth data of all primitives corresponding to each tile and determine the pre-depth data corresponding to each tile. After all depth data corresponding to all tiles are sorted, the pre-depth data of the whole scene in the tile resolution are stored in the pre-Z buffer 325.

After the vertex transformation is performed by the vertex shader 314, the vertex data of all primitives are also transmitted to the bin store 318. The relationship between all primitives and the bins are established by the bin store 318 and then stored into the bin buffer 324. That is, after all primitives are subjected to the vertex transformation, the vertex data of all primitives touching each bin may be recorded by the bin store 318. Meanwhile, a bin table is established. The bin store 318 may store the bin tables for all bins into the bin buffer 324. Each bin table represents the vertex data of the primitives touching the corresponding bin.

In this embodiment, the pixel processing circuit 330 comprises a rasterization processing circuit 331 and a rendering device 335. The rasterization processing circuit 331 comprises a bin loader 332 and an occlusion culling circuit 334. The rendering device 335 comprises a pixel shader circuit 336 and a post blending circuit 338. The buffering device 320 further comprises a texture buffer 327 and a color/Z buffer 329.

The bin tables temporarily stored in the bin buffer 324 may be loaded into the bin loader 332 of the rasterization processing circuit 331 and then transmitted to the occlusion culling circuit 334.

After the bin tables are received by the occlusion culling circuit 334, the depth data of all primitives are acquired according to the vertex data of all primitives in the bin tables. The occlusion culling circuit 334 segments and converts each primitive into tiles and calculates the depth data thereof.

The occlusion culling circuit 334 further compares the depth data for the converted tiles with the pre-depth data in the pre-Z buffer 325 and determines whether the depth data for the converted tiles are transmitted to the pixel shader circuit 336 according to a predetermined criterion.

As mentioned above, all pre-depth data of the whole scene have been stored in the pre-Z buffer 325. If the depth data of the tile converted by the occlusion culling circuit 334 is not larger than the corresponding pre-depth data in the pre-Z buffer 325, it means that the converted tile is not obscured. Consequently, the converted tile is transmitted from the occlusion culling circuit 334 to the pixel shader circuit 336.

On the other hand, if the depth data of the tile converted by occlusion culling circuit 334 is larger than the corresponding pre-depth data in the pre-Z buffer 325, it means that the converted tile is obscured. Under this circumstance, the converted tile is directly discarded by the occlusion culling circuit 334 without being transmitted to the pixel shader circuit 336.

As mentioned above, after the occlusion culling circuit 334 receives the bin tables and segments each primitive into the converted tiles, it is not necessary to additionally sort the converted tiles. After the depth data of the converted tiles are compared with the corresponding pre-depth data in the pre-Z buffer 325, the converted tiles requiring further processing are transmitted to the pixel shader circuit 336. Consequently, the processing efficiency of the pixel shader circuit 336 is effectively enhanced.

After the converted tile is received by the pixel shader circuit 336 of the pixel processing circuit 330, the pixel shader circuit 336 performs an arithmetic operation on all pixels of the primitive corresponding to the converted tile, selectively reads a specified texture from the texture buffer 327 and transmits the specified texture to the post blending circuit 338. Consequently, the post blending circuit 338 generates the color values and the depth values of all pixels and stores the color and depth values into the color/Z buffer 329.

In the 3D graphic processing circuit of this embodiment, the pre-depth data of the whole scene in the tile resolution are firstly acquired by the pre-Z testing circuit 316 of the vertex processing circuit 310 and stored in the pre-Z buffer 325. Then, while the occlusion culling circuit 334 of the pixel processing circuit 330 judges the converted tiles, it is not necessary to additionally sort the converted tiles. After the depth data of the converted tiles are compared with the corresponding pre-depth data in the pre-Z buffer 325, the converted tiles to be processed are transmitted to the pixel shader circuit 336 while the converted tiles which need not be processed are discarded.

It should be noted that numerous modifications and alterations may be made while retaining the teachings of the present disclosure. For example, in another embodiment, the pre-depth data represent a depth value range rather than a single depth value. Under this circumstance, the occlusion culling circuit 334 is possibly unable to judge whether the converted tile is obscured according to the predetermined criterion, and thus the converted tile is also referred as an ambiguous tile. The ambiguous tile may be transmitted from the occlusion culling circuit 334 to the pixel shader circuit 336.

Preferably, the vertex processing circuit 310 and the pixel processing circuit 330 of the 3D graphic processing circuit 300 may be integrated into an integrated circuit. Preferably, the bin buffer 324, the pre-Z buffer 325 and the 3D graphic processing circuit 300 may be integrated into an integrated circuit in order to increase the overall data accessing efficiency. Alternatively, the bin buffer 324 and the pre-Z buffer 325 are on-die memories such as static random-access memories (SRAM) or cache memories.

Figure 4:
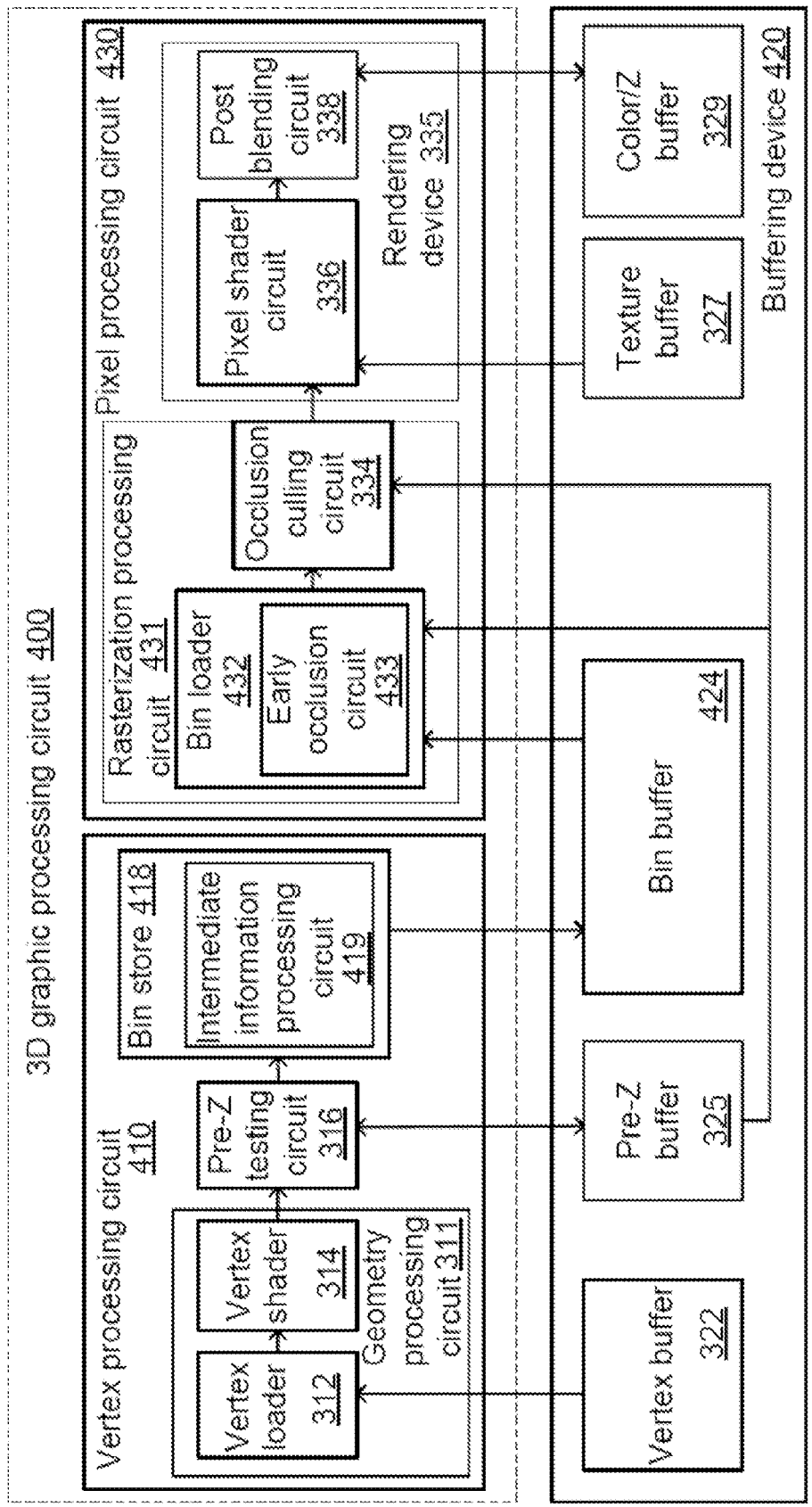
FIG. 4 is a schematic circuit block diagram illustrating a 3D graphic processing circuit according to an embodiment of the present disclosure.

FIG. 4 is a schematic circuit block diagram illustrating a 3D graphic processing circuit according to a second embodiment of the present disclosure. As shown in FIG. 4, the 3D graphic processing circuit 400 comprises a vertex processing circuit (VP) 410 and a pixel processing circuit (PP) 430. The 3D graphic processing circuit 400 is connected to a buffering device 420. For example, the buffering device 420 is an external memory such as DRAM or SRAM.

The vertex processing circuit 410 comprises a geometry processing circuit 311, a pre-Z testing circuit 316 and a bin store 418. The geometry processing circuit 311 comprises a vertex loader 312 and a vertex shader 314.

The pixel processing circuit 430 comprises a rasterization processing circuit 431 and a rendering device 335. The rasterization processing circuit 431 comprises a bin loader 432 and an occlusion culling circuit 334. The rendering device 335 comprises a pixel shader circuit 336 and a post blending circuit 338.

The buffering device 320 comprises a vertex buffer 322, a pre-Z buffer 325 and a bin buffer 424 with an intermediate information, a texture buffer 327 and a color/Z buffer 329.

In comparison with the first embodiment, the bin store 418, the rasterization processing circuit 431 and the bin buffer 424 of this embodiment are distinguished. The operating principles of the other components are similar to those of the first embodiment, and are not redundantly described herein.

Similarly, the pre-Z testing circuit 316 may process the depth data of all primitives corresponding to each tile and determine the pre-depth data corresponding to each tile. In this embodiment, an intermediate information processing circuit 419 of the bin store 418 may receive the processed data from the pre-Z testing circuit 316 and further add the intermediate information to the bin table. Consequently, in addition to the vertex data of all primitives touching each bin, the bin table further records the intermediate information. In this embodiment, the intermediate information indicates the positions of the tiles covered by the primitives corresponding to each bin and the smallest depth data among the covered tiles. The finished bin tables are stored in the bin buffer 424.

In this embodiment, the bin loader 432 further comprises an early occlusion circuit 433. After the bin tables temporarily stored in the bin buffer 424 are loaded into the bin loader 432, the early occlusion circuit 433 may early discard the obscured primitives according to the intermediate information and the pre-depth data in the pre-Z buffer 325.

Since the data of some primitives of the bin table to be transmitted to the occlusion culling circuit 334 are discarded by the early occlusion circuit 433, the occlusion culling circuit 334 may process the bin tables more efficiently.

Figure 5:
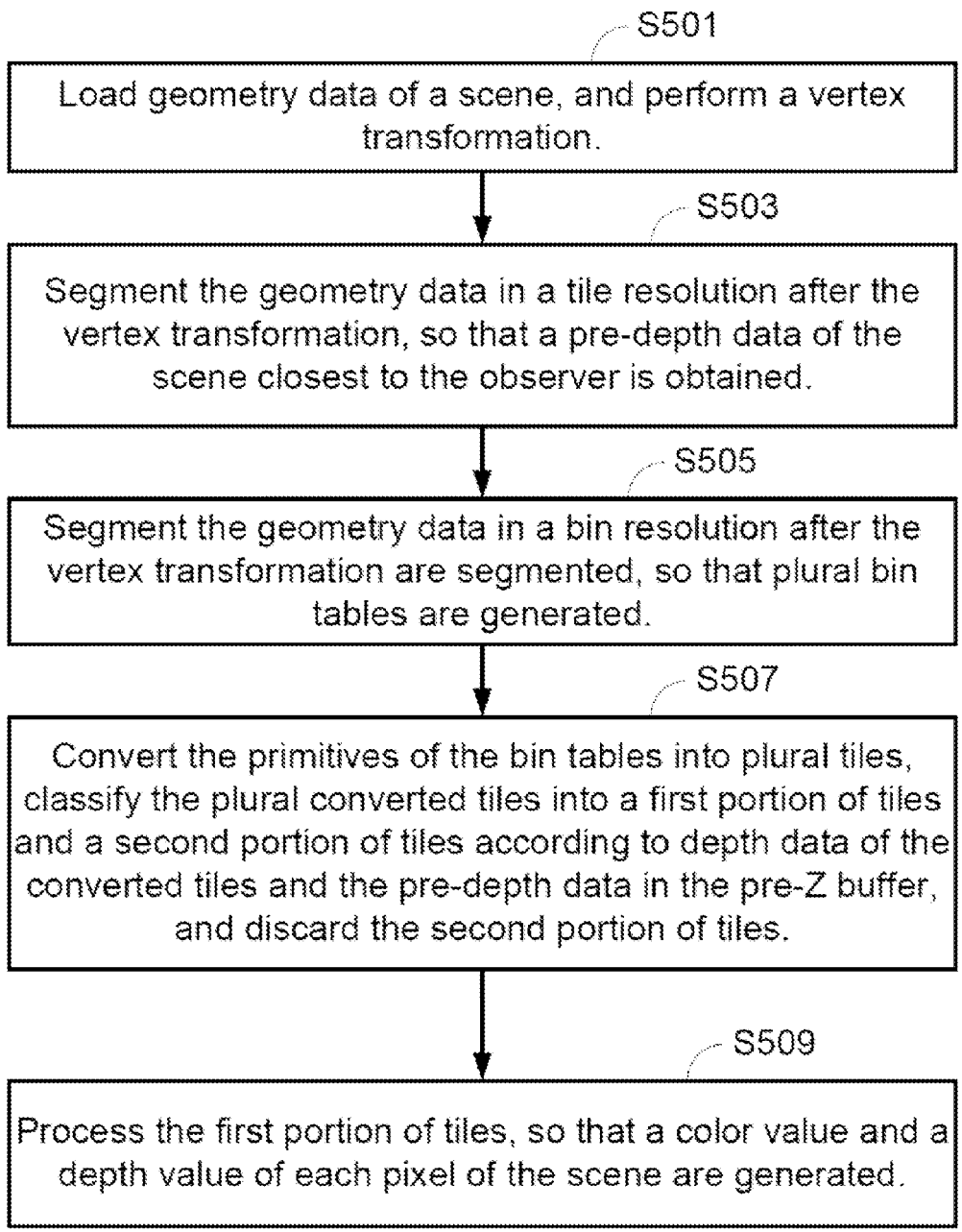
FIG. 5 is a flowchart illustrating a depth processing method of a 3D graphic processing circuit according to an embodiment of the present disclosure.

FIG. 5 is a flowchart illustrating a depth processing method of a 3D graphic processing circuit according to an embodiment of the present disclosure. Firstly, in a step S501, geometry data of a scene are loaded and a vertex transformation is performed on the geometry data. Then, in a step S503, the geometry data after the vertex transformation are segmented in a tile resolution, so that a pre-depth data of the scene closest to the observer is obtained. Preferably, the pre-depth data is stored in a pre-Z buffer. Then, in a step S505, the geometry data after the vertex transformation are segmented in a bin resolution, so that plural bin tables are generated. Then, in a step S507, the primitives of the bin tables are converted into plural tiles, the plural converted tiles are classified into a first portion of tiles and a second portion of tiles according to depth data of the converted tiles and the pre-depth data in the pre-Z buffer, and the second portion of tiles are discarded. Then, in a step S509, the first portion of tiles are processed, so that a color value and a depth value of each pixel of the scene are generated.

For example, in the step S501, the geometry data contain vertex data of plural primitives. In the step S503, the plural primitives after the vertex transformation are segmented in the tile resolution, so that the pre-depth data of the scene in the tile resolution are obtained. In the step S505, the plural primitives after the vertex transformation are segmented in the bin resolution, so that the plural bin tables are generated.

In the step S507, the plural converted tiles are classified into the first portion of tiles and the second portion of tiles according to a predetermined criterion. According to the predetermined criterion, the converted tiles whose depth data are not larger than the corresponding pre-depth data in the pre-Z buffer are classified as the first portion of tiles, and the converted tiles whose depth data are larger than the corresponding pre-depth data in the pre-Z buffer are classified as the second portion of tiles. Alternatively, if the occlusion culling circuit is unable to judge whether the converted tiles are larger than the corresponding pre-depth data in the pre-Z buffer according to the predetermined criterion, the converted tiles are classified as the first portion of tiles. Alternatively, the bin tables are converted into the converted plural tiles utilizing an intermediate information of the bin tables.

For example, in the step S505, the intermediate information is generated according to the geometry data in the tile resolution, and the intermediate information is stored in the bin tables. The intermediate information represents the positions of the tiles covered by the primitives corresponding to each bin and the smallest depth data among the covered tiles.

To sum up, the present disclosure discloses a graphic processing circuit. After the vertex transformation is completed, the pre-Z testing circuit 316 of the vertex processing circuit 310 will construct the pre-depth data of the whole scene in a tile resolution and store the pre-depth data into the pre-Z buffer 325. Moreover, the converted tiles which need not be processed are discarded by the occlusion culling circuit 334 of the pixel processing circuit 330. Consequently, the processing efficiency of the pixel shader circuit 336 is effectively enhanced.

While the present disclosure has been described in terms of what is presently considered to be the most practical and preferred embodiments, it is to be understood that the present disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A graphic processing circuit, comprising:
    a vertex processing circuit comprising:
        a geometry processing circuit for loading geometry data of a scene and performing a vertex transformation;
        a pre-Z testing circuit, connected to the geometry processing circuit, for receiving the geometry data after the vertex transformation and segmenting the geometry data in a tile resolution, thereby obtaining pre-depth data of the scene in the tile resolution by sorting all geometry data corresponding to each tile; and
        a bin store, connected to the pre-Z testing circuit, for receiving the geometry data after the vertex transformation and segmenting the geometry data in a bin resolution, thereby generating plural bin tables; and
    a pixel processing circuit comprising:
        a rasterization processing circuit, connected to a bin buffer which is connected to the bin store, for loading the plural bin tables from the bin buffer, converting the plural bin tables into plural tiles, classifying the plural converted tiles into a first portion of tiles and a second portion of tiles by comparing depth data of the converted tiles and the pre-depth data of the scene in the tile resolution as being sorted by the pre-Z testing circuit, and discarding the second portion of tiles; and
        a rendering device, connected to the rasterization processing circuit, for receiving and processing the first portion of tiles, thereby generating a color value and a depth value of each pixel of the scene.

2. The graphic processing circuit as claimed in claim 1, wherein the geometry processing circuit comprises:
    a vertex loader for loading the geometry data of the scene, wherein the geometry data contain vertex data of plural primitives; and
    a vertex shader, connected to the vertex loader, for receiving the vertex data of the plural primitives from the vertex loader and performing the vertex transformation.

3. The graphic processing circuit as claimed in claim 2, wherein the vertex data of the plural primitives after the vertex transformation are further received by the pre-Z testing circuit, and the plural primitives are segmented in the tile resolution by the pre-Z testing circuit, so that the pre-depth data of the scene in the tile resolution are obtained.

4. The graphic processing circuit as claimed in claim 3, wherein the vertex data of the plural primitives after the vertex transformation are further received by the bin store, and the plural primitives are segmented in the bin resolution by the bin store, so that the plural bin tables are generated.

5. The graphic processing circuit as claimed in claim 4, wherein the vertex data of the plural primitives are loaded into the vertex loader from a vertex buffer.

6. The graphic processing circuit as claimed in claim 4, wherein the bin store further stores the plural bin tables into the bin buffer.

7. The graphic processing circuit as claimed in claim 4, wherein the pre-Z testing circuit further stores the pre-depth data of the scene in the tile resolution into a pre-Z buffer.

8. The graphic processing circuit as claimed in claim 7, wherein the rasterization processing circuit comprises:
    a bin loader for loading the plural bin tables; and
    an occlusion culling circuit, connected to the bin loader, for converting the plural bin tables into the plural converted tiles, classifying the plural converted tiles into the first portion of tiles and the second portion of tiles according to according to the depth data of the converted tiles and the pre-depth data of the scene in the tile resolution, and discarding the second portion of tiles.

9. The graphic processing circuit as claimed in claim 8, wherein the occlusion culling circuit classifies the plural converted tiles into the first portion of tiles and the second portion of tiles according to a predetermined criterion.

10. The graphic processing circuit as claimed in claim 9, wherein according to the predetermined criterion, the converted tiles whose depth data are not larger than the corresponding pre-depth data in the pre-Z buffer are classified as the first portion of tiles, and the converted tiles whose depth data are larger than the corresponding pre-depth data in the pre-Z buffer are classified as the second portion of tiles.

11. The graphic processing circuit as claimed in claim 10, wherein if the occlusion culling circuit fails to judge whether the depth data of the converted tiles are larger than the corresponding pre-depth data in the pre-Z buffer according to the predetermined criterion, the converted tiles are classified as the first portion of tiles.

12. The graphic processing circuit as claimed in claim 1, wherein the rendering device comprises:
    a pixel shader circuit for receiving and processing the first portion of tiles; and
    a post blending circuit, connected to the pixel shader, for generating the color value and the depth value of each pixel of the scene.

13. The graphic processing circuit as claimed in claim 1, wherein the pre-Z testing circuit further stores the pre-depth data of the scene in the tile resolution into a pre-Z buffer, and the bin store further stores the plural bin tables into the bin buffer.

14. The graphic processing circuit as claimed in claim 1, wherein the graphic processing circuit is integrated into an integrated circuit.

15. A graphic processing circuit, comprising:
    a vertex processing circuit comprising:
        a geometry processing circuit for loading geometry data of a scene and performing a vertex transformation;
        a pre-Z testing circuit, connected to the geometry processing circuit, for receiving the geometry data after the vertex transformation and segmenting the geometry data in a tile resolution, thereby obtaining pre-depth data of the scene in the tile resolution by sorting all geometry data corresponding to each tile; and a bin store, connected to the pre-Z testing circuit, for receiving the geometry data after the vertex transformation and segmenting the geometry data in a bin resolution, thereby generating plural bin tables, wherein the bin store further generates an intermediate information according to the geometry data, and the intermediate information is stored in the bin tables; and a pixel processing circuit comprising:

a rasterization processing circuit, connected to a bin buffer which is connected to the bin store, for loading the plural bin tables from the bin buffer, early discarding plural obscured primitives according to the intermediate information and the pre-depth data of the scene in the tile resolution, converting the unobscured primitives into plural tiles, classifying the plural converted tiles into a first portion of tiles and a second portion of tiles by comparing depth data of the converted tiles and the pre-depth data of the scene in the tile resolution as being sorted by the pre-Z testing circuit, and discarding the second portion of tiles; and a rendering device, connected to the rasterization processing circuit, for receiving and processing the first portion of tiles, thereby generating a color value and a depth value of each pixel of the scene.

16. The graphic processing circuit as claimed in claim 15, wherein the geometry processing circuit comprises:

a vertex loader for loading the geometry data of the scene, wherein the geometry data contain vertex data of plural primitives; and a vertex shader, connected to the vertex loader, for receiving the vertex data of the plural primitives from the vertex loader and performing the vertex transformation.

17. The graphic processing circuit as claimed in claim 16, wherein the vertex data of the plural primitives after the vertex transformation are further received by the pre-Z testing circuit, and the plural primitives are segmented in the tile resolution by the pre-Z testing circuit, so that the pre-depth data of the scene in the tile resolution are obtained.

18. The graphic processing circuit as claimed in claim 17, wherein the vertex data of the plural primitives after the vertex transformation are further received by the bin store, and the plural primitives are segmented in the bin resolution by the bin store, so that the plural bin tables are generated.

19. The graphic processing circuit as claimed in claim 18, wherein the bin store further comprises an intermediate information processing circuit for receiving the geometry data in the tile resolution, thereby generating the intermediate and adding the intermediate information to the plural bin tables.

20. The graphic processing circuit as claimed in claim 19, wherein the intermediate information represents positions of the tiles covered by the primitives corresponding to each bin and the smallest depth data among the covered tiles.

21. The graphic processing circuit as claimed in claim 18, wherein the vertex data of the plural primitives are loaded into the vertex loader from a vertex buffer.

22. The graphic processing circuit as claimed in claim 18, wherein the bin store further stores the plural bin tables into the bin buffer.

23. The graphic processing circuit as claimed in claim 18, wherein the pre-Z testing circuit further stores the pre-depth data of the scene in the tile resolution into a pre-Z buffer.

24. The graphic processing circuit as claimed in claim 23, wherein the rasterization processing circuit comprises:

a bin loader for loading the plural bin tables and selecting a portion of the plural primitives according to the intermediate information; and an occlusion culling circuit, connected to the bin loader, for converting the portion of the plural primitives into the plural converted tiles, classifying the plural converted tiles into the first portion of tiles and the second portion of tiles according to according to the depth data of the converted tiles and the pre-depth data of the scene in the tile resolution, and discarding the second portion of tiles.

25. The graphic processing circuit as claimed in claim 24, wherein the occlusion culling circuit classifies the plural converted tiles into the first portion of tiles and the second portion of tiles according to a predetermined criterion.

26. The graphic processing circuit as claimed in claim 25, wherein according to the predetermined criterion, the converted tiles whose depth data are not larger than the corresponding pre-depth data in the pre-Z buffer are classified as the first portion of tiles, and the converted tiles whose depth data are larger than the corresponding pre-depth data in the pre-Z buffer are classified as the second portion of tiles.

27. The graphic processing circuit as claimed in claim 26, wherein if the occlusion culling circuit is unable to judge whether the depth data of the converted tiles are larger than the corresponding pre-depth data in the pre-Z buffer according to the predetermined criterion, the converted tiles are classified as the first portion of tiles.

28. The graphic processing circuit as claimed in claim 15, wherein the rendering device comprises:

a pixel shader circuit for receiving and processing the first portion of tiles; and a post blending circuit, connected to the pixel shader, for generating the color value and the depth value of each pixel of the scene.

29. The graphic processing circuit as claimed in claim 15, wherein the graphic processing circuit is integrated into an integrated circuit.

30. A depth processing method for a graphic processing circuit, comprising:

loading geometry data of a scene and performing a vertex transformation by a geometry processing circuit;

segmenting the geometry data in a tile resolution by a pre-Z testing circuit connected to the geometry processing circuit after the vertex transformation, thereby obtaining pre-depth data of the scene in the tile resolution by sorting all geometry data corresponding to each tile;

segmenting the geometry data in a bin resolution after the vertex transformation by a bin store connected to the pre-Z testing circuit, generating plural bin tables by the bin store;

converting the plural bin tables, which are loaded from a bin buffer connected to the bin store, into plural tiles by a rasterization processing circuit;

classifying the plural converted tiles into a first portion of tiles and a second portion of tiles by the rasterization processing circuit by comparing depth data of the converted tiles and the pre-depth data of the scene in the tile resolution as being sorted in segmenting the geometry data in the tile resolution after the vertex transformation;

discarding the second portion of tiles; and processing the first portion of tiles by a rendering device connected to the rasterization processing circuit, thereby generating a color value and a depth value of each pixel of the scene.

31. The depth processing method as claimed in claim 30, wherein the geometry data contain vertex data of plural primitives, wherein in segmenting the geometry data in the tile resolution after the vertex transformation, thereby obtaining pre-depth data of the scene, the plural primitives are segmented in the tile resolution, so that the pre-depth data of the scene in the tile resolution are obtained, wherein in segmenting the geometry data in the bin resolution after the vertex transformation, generating plural bin tables, the plural primitives are segmented in the bin resolution, so that the plural bin tables are generated.

32. The depth processing method as claimed in claim 30, wherein the converted tiles whose depth data are not larger than the corresponding pre-depth data are classified as the first portion of tiles, and the converted tiles whose depth data are larger than the corresponding pre-depth data are classified as the second portion of tiles, wherein if it fails to judge whether depth of the converted tiles are larger than the corresponding pre-depth data, the converted tiles are classified as the first portion of tiles.

33. The depth processing method as claimed in claim 30, wherein the segmenting the geometry data in the bin resolution after the vertex transformation, generating plural bin tables further comprises generating an intermediate information according to the geometry data in the tile resolution and storing the intermediate information.

34. The depth processing method as claimed in claim 33, wherein the intermediate information represents positions of the tiles covered by the primitives corresponding to each bin and the smallest depth data among the covered tiles.

35. The depth processing method as claimed in claim 33, wherein the converting further comprises converting the bin tables into the plural converted tiles according to the intermediate information of the bin tables.

* * * * *